United States Patent Office 2,758,531
Patented Aug. 14, 1956

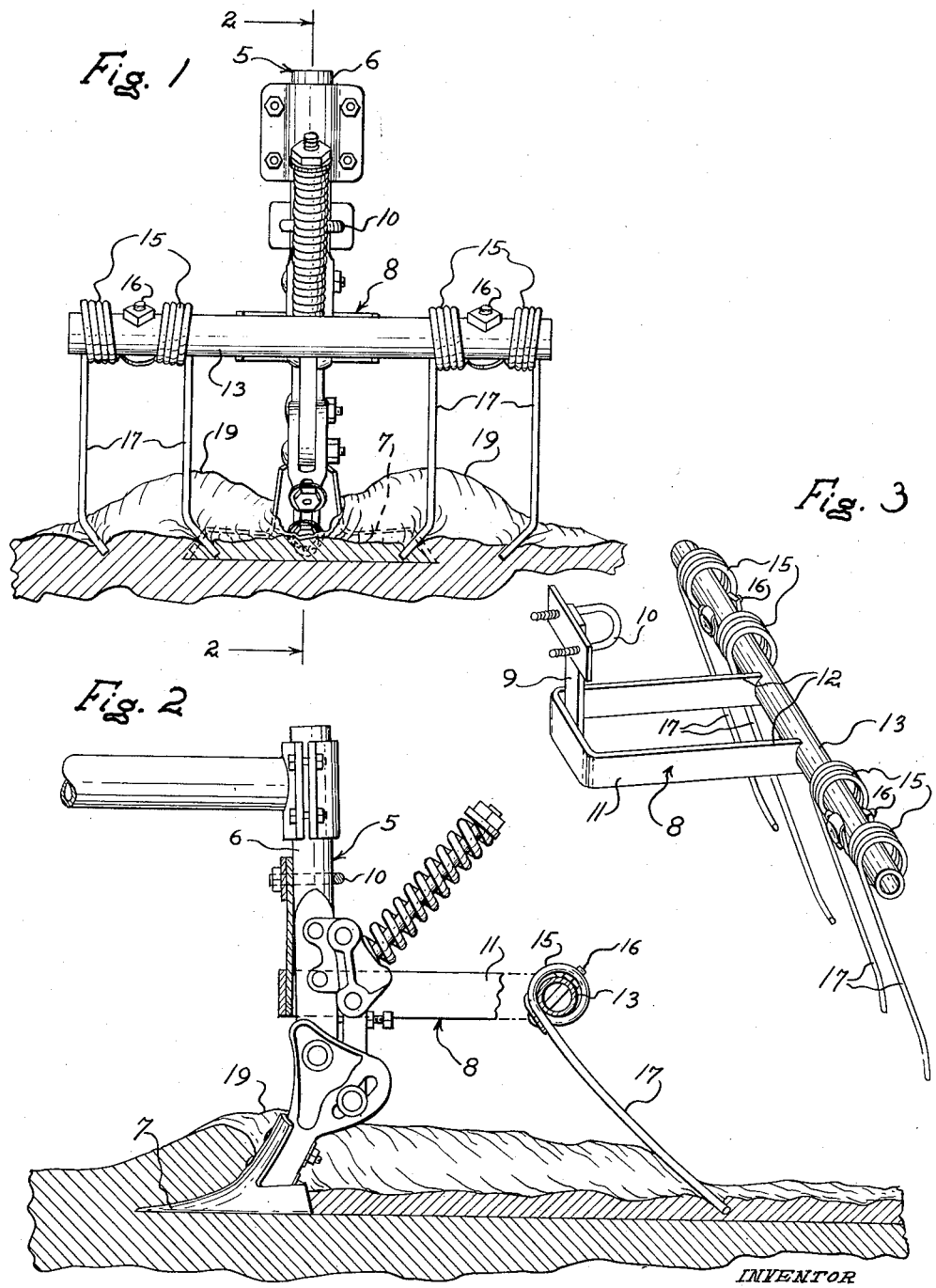

2,758,531

GROUND AGITATING AND LEVELING ATTACHMENT FOR IMPLEMENTS

George Siems, Fairmont, Minn.

Application February 9, 1953, Serial No. 335,631

3 Claims. (Cl. 97—56)

This invention relates to ground working implements. More particularly, it relates to a soil leveling attachment for use in conjunction with ground working implements to level the soil in the wake of travel of such implements.

Many agricultural machines such as corn cultivators, have ground working implements which are supported by upright shanks and which leave the soil in the wage of their travel in ridges and valleys. Soil left in such condition is especially susceptible to erosion and in addition, makes harvesting of the crops a very difficult, wasteful, and damaging operation with respect to the crop and the harvesting machinery. My invention is directed toward eliminating such conditions.

It is a general object of my invention to provide ground leveling apparatus for use in conjunction with ground working implements which is of cheap and simple construction and operation.

A more specific object is to provide a ground leveling attachment for ground working implements which may be readily attached to the shank of the implement and will level the soil in a simple but efficient manner.

Another object is to provide a cheap and simple ground leveling attachment which will follow in the wake of a ground working implement and efficiently work the soil laterally back into the valleys created by the implement.

These and other objects and advantages of my invention will more fully appear from the following description made in connection with the accompanying drawings, wherein like reference characters refer to the same or similar parts throughout the several views, and in which:

Fig. 1 is a rear elevational view of one embodiment of my invention mounted in operating position upon the shank of a ground working implement;

Fig. 2 is a vertical sectional view of the device taken longitudinally thereof and showing parts thereof in side elevation; and Fig. 3 is a perspective view of the attachment.

My invention is especially adapted for use in conjunction with a ground working implement such as is shown in Figs. 1 and 2 and indicated generally by the numeral 5. Such a ground working implement normally has an upright shank 6 at the lower end of which is secured a cultivator shovel 7 or some similar ground engaging tool. My device may be manufactured as an attachment to a ground working implement sold separately therefrom or, of course, it may be included as a part of the original complete ground working implement. The entire attachment is indicated generally by the numeral 8. This unit is provided with an upstanding bracket 9 carrying a clamp member 10 which is adapted to clamp the unit rigidly to the shank 6 of the ground working implement in the manner shown in Figs. 1 and 2.

The unit 8, as shown, includes a U-shaped framework 11 which, when the unit is mounted upon the shank 6, extends generally horizontally, and the normally free end portions 12 of which extend rearwardly with respect to the shank. A cross member 13 is rigidly secured to the free end portions 12 and it in turn has free end portions 14, which as best shown in Fig. 1, are disposed laterally of the shank 6 and also of the framework 11.

Mounted on the cross member 13 in laterally spaced positions relative to the length of the cross member are a plurality of spring elements 15. These spring elements are connected together in pairs as best shown in Fig. 1, and secured to the cross member 13 by a bolt 16. Each of these springs 15 supports a rigid rod-like agitator 17 which extends downwardly and rearwardly from the cross member 13. As best shown in Fig. 1, these agitators are spaced laterally of the cross member 13 and are positioned at either side of the shank 6. The lower end portions 18 of these agitators 17 are bent inwardly toward the shank 6 and extend downwardly into the soil. Because of the spring mounting afforded by the springs 15, these agitators 17 can move upwardly and downwardly within the soil, swinging about the longitudinal axis of the cross member 13 when so doing.

Normally when a ground engaging tool such as the shovel 7 moves through the soil, it forms a ridge of soil to either side of its direction of travel. These ridges have been indicated by the numeral 19 and can best be seen in Fig. 1 and Fig. 2. Unless some means is provided for leveling the soil, serious erosion may result and the ground is in a very unsatisfactory condition for further travel thereacross by harvesting or other implements. The lower end portions 18 of the agitators 17 extend downwardly into the soil, as shown in Fig. 1, and agitate the soil, causing the latter to be leveled in the wake of the shovel 7 so as to eliminate the undesirable conditions pointed out above. Because these end portions 18 are resiliently mounted by the springs 15, they move upwardly and downwardly continuously within the soil, thereby further increasing the agitation of the soil and facilitating the leveling of the ridges 19. I have found that these agitators 17 do an excellent job of eliminating the ridges 19 which are normally left in the wake of such a shovel 7 and leave the soil in a level and very desirable condition, a substantial portion of the soil being moved together to a position directly behind the shovel as it moves along through the soil.

It should be noted that my ground leveling apparatus is of extremely cheap and simple construction and operation. Even unskilled laborers can attach my ground leveling attachment so that the same will function in a very desirable manner. The cost of the materials is comparatively slight and the device functions in a highly efficient manner to level the ridges 19 which would normally be left in the wake of such a ground working tool. It should be noted that it is a simple matter to attach or detach this device relative to any ground working tool which may have been previously owned by the farmer.

It will of course be understood that various changes may be made in the form, details, arrangements and proportions of the various parts without departing from the scope of my invention.

What is claimed is:

1. A ground leveling attachment for ground working implements having a supporting shank, said attachment comprising a U-shaped framework adapted to be rigidly connected to the shank of such an implement at a point vertically spaced relative to said framework and in encircling relation with its normally free ends extending rearwardly, a rigid cross-member rigidly mounted upon the free ends of said framework and having free end portions extending laterally thereof, a pair of laterally spaced spring elements mounted upon each of said free end portions of said cross-member, and a plurality of downwardly and rearwardly extending rigid agitator elements one each of which is supported by one of said spring elements, the lower end portions of said agitator elements extending downwardly into the soil and agitating and leveling the same when said attachment is so mounted upon the shank of such a ground working implement.

2. A ground leveling attachment for ground working implements having a supporting shank, said attachment comprising a generally U-shaped framework adapted to be rigidly connected to the shank of such an implement at a point vertically spaced relative to said framework and in encircling relation with its normally free ends extending rearwardly, a rigid cross member rigidly mounted upon the free ends of said framework and having free end portions extending laterally thereof, spring elements mounted upon the free end portions of said cross member, and a downwardly and rearwardly extending rigid agitator element supported by each of said spring elements, the lower end portions of said agitator elements being turned inwardly toward said shank and extending downwardly into the soil and agitating and levelling the same when said attachment is so mounted upon the shank of such a ground working implement.

3. A ground levelling attachment for ground working implements having a supporting shank with a vertically extending portion, said attachment comprising a generally U-shaped framework having forward portions, clamp means connected with said framework in vertically spaced relation and adapted to fixedly secure the same in encircling relation to the vertically extending portion of such a supporting shank, said framework extending rearwardly from said clamp means when so secured, and a plurality of resiliently mounted downwardly extending rigid rod-like agitators supported by the rearwardly extending portion of said framework and spaced laterally of said clamp means, said agitators having lower end portions extending downwardly into the soil and agitating and leveling the same when said framework is so secured to the vertically extending portion of such a ground working implement.

References Cited in the file of this patent
UNITED STATES PATENTS

| | | |
|---|---|---|
| 407,062 | Cook | July 16, 1889 |
| 957,322 | Foulke | May 10, 1910 |
| 1,086,015 | Billhorn | Feb. 3, 1914 |
| 1,202,562 | Mintern | Oct. 24, 1916 |
| 1,842,268 | Holmgren | Jan. 19, 1932 |
| 2,136,851 | Jess | Nov. 15, 1938 |
| 2,483,204 | Johnson et al. | Sept. 27, 1949 |
| 2,659,290 | Glomb | Nov. 17, 1953 |